United States Patent
Bittner

(10) Patent No.: US 9,822,738 B2
(45) Date of Patent: Nov. 21, 2017

(54) EJECTOR AND ARRANGEMENT FOR USE IN A MOTOR VEHICLE HAVING A TURBOCHARGER

(71) Applicant: Eagle Actuator Components GmbH & Co. KG, Weinheim (DE)

(72) Inventor: Joerg Bittner, Novi, MI (US)

(73) Assignee: EAGLE ACTUATOR COMPONENTS GMBH & CO. KG, Weinheim (DE)

(*) Notice: Subject to any disclaimer, the term of this patent is extended or adjusted under 35 U.S.C. 154(b) by 0 days.

(21) Appl. No.: 15/086,226

(22) Filed: Mar. 31, 2016

(65) Prior Publication Data
US 2016/0377038 A1   Dec. 29, 2016

Related U.S. Application Data

(60) Provisional application No. 62/184,319, filed on Jun. 25, 2015.

(51) Int. Cl.
| | | |
|---|---|---|
| F02M 25/08 | (2006.01) | |
| F04F 5/46 | (2006.01) | |
| F04F 5/20 | (2006.01) | |
| F02M 35/10 | (2006.01) | |
| F02B 37/16 | (2006.01) | |

(52) U.S. Cl.
CPC ......... *F02M 25/089* (2013.01); *F02B 37/164* (2013.01); *F02M 25/0836* (2013.01); *F02M 35/10229* (2013.01); *F04F 5/20* (2013.01); *F04F 5/46* (2013.01); *Y02T 10/144* (2013.01)

(58) Field of Classification Search
CPC ............. F02M 25/089; F02M 25/0836; F02M 35/10229; F04F 5/20; F04F 5/46
USPC ...................... 123/533, 559.1, 564
See application file for complete search history.

(56) References Cited

U.S. PATENT DOCUMENTS

| | | | |
|---|---|---|---|
| 2008/0260544 A1* | 10/2008 | Tell ........................... | F04F 5/44 417/163 |
| 2009/0297367 A1* | 12/2009 | Yamada .................... | F04F 5/14 417/151 |

* cited by examiner

*Primary Examiner* — Mahmoud Gimie
(74) *Attorney, Agent, or Firm* — Leydig, Voit & Mayer Ltd.

(57) ABSTRACT

An ejector, or arrangement having the ejector, has a compact structure requiring little installation space, permitting a sufficient pumping action, and, in case of an error, the error can be unambiguously detected and diagnosed as the source of the problem, which ejector for insertion into a receptacle, has a base element with a throat that fluid-connects a first opening and a second opening to each other, whereby the throat has a narrowest part that is fluid-connected to an associated third opening, and whereby the throat widens, at least in sections, towards the first and second openings, wherein, as a functional component, the ejector can be inserted into and/or positioned in a mating receptacle in the correct orientation so as to fulfill its function as a jet pump in an arrangement.

12 Claims, 4 Drawing Sheets

EJECTOR AND ARRANGEMENT FOR USE IN A MOTOR VEHICLE HAVING A TURBOCHARGER

CROSS-REFERENCE TO RELATED APPLICATIONS

Priority is claimed to U.S. Provisional Patent Application Ser. No. 62/184,319, filed on Jun. 25, 2015, the entire disclosure of which is hereby incorporated by reference herein.

FIELD

The invention relates to an ejector and to an arrangement with such an ejector.

BACKGROUND

Thanks to their simple and sturdy structure, ejectors or jet pumps are often used in so-called regeneration systems of motor vehicles. Regeneration systems bring about a regeneration of the activated charcoal filter which contains fuel vapors. These fuel vapors can be fed to an engine. Such a regeneration system is shown in FIG. 1 by way of an example, specifically for turbocharged engines.

The use of auxiliary components such as, for example, ejectors, in regeneration systems is necessary nowadays since, as a result of consumption-reducing measures in engines, the sources that could generate an adequate negative pressure in the engine over prolonged periods of time are much more limited. Consumption-reducing measures that result in such limitations are downsizing, dethrottling of intake systems, turbocharging, stop-start technologies and, in particular, the hybridization of motor vehicles.

A regeneration that only utilizes an operation-dependent usual negative pressure in an intake manifold or upstream from the compressor of a turbocharger is no longer sufficient. Rather, additional auxiliary components are needed.

In motor vehicles with start-stop technology and in hybrid vehicles, there are times when the internal combustion engine is not running at all, as a result of which no regeneration can even take place at all during these periods of time. However, depending on the climate conditions, fuel vapors continue to be produced.

The above-mentioned technical problems are of particular significance, for example, in the United States where the pertinent legislation requires all motor vehicles to be equipped with a so-called ORVR (onboard refueling vapor recovery) system. The ORVR system has to capture the fuel vapors that escape from the tank during refueling.

These fuel vapors are generally captured with the same activated charcoal filter that also captures the other fuel vapors that escape from the tank. Consequently, in the United States, far greater quantities of purge air are needed to regenerate an activated charcoal filter than, for example, in Europe, where ORVR systems are not required. This is because in Europe, the fuel vapors displaced from the tank during refueling are captured by vapor recovery systems installed on the filling nozzle of the gas station pump. In addition to the above-mentioned requirements, however, there is also a need to reduce permissible emissions even further.

Ejectors are used to assist the regeneration of an activated charcoal filter in motor vehicles having turbocharged engines. Here, an artificial short circuit is created between the compressed air, downstream from the compressor, and the air intake, upstream from the compressor, whereby the pressure gradient is utilized to generate a drive flow. Depending on the charging pressure, an appropriate regeneration flow is then generated to purge the activated charcoal filter.

In the United States, it is also required that the proper functioning of such regeneration systems be regularly monitored during operation by means of so-called on-board diagnostics (OBD) in the motor vehicle.

In a regeneration system according to FIG. 1, the concrete problem arises of diagnosing the line leading from the ejector to the intake system of the turbocharger. This line or the integrity of this line is difficult to diagnose without complicated additional measures or it is even impossible. In FIG. 1, this line is designated by the reference numeral 4a and it is connected to an ejector 4 of the state of the art.

Before this backdrop, the legislation stipulates that monitoring of the outlet side of the ejector is not necessary if it runs inside the walls of the intake system. Here, the overall design has to ensure that an error, for instance, a break, can be diagnosed. Among other things, this led to a configuration as is shown in FIG. 2. In this configuration, the ejector is connected directly to the intake system upstream from the turbocharger. The ejector can be connected to the intake system, among other things, by means of rotowelding.

In the ejector according to FIG. 2, which is directly connected to the intake system, the feed connections are configured in one piece with the ejector. However, this entails the risk that the ejector will be disconnected from the intake system, for example, because of a break, although the fundamental functionality of the ejector will be retained. Then a mixed flow or an outflow on the outlet side would escape from the ejector into the environment, which is not permissible. In particular, this error, however, would not be diagnosable.

An ejector according to FIG. 2 that is connected directly to the intake system is disadvantageous because of its exposed location. The fact that it protrudes quite far relative to a wall of the intake system is detrimental and exposes the ejector to high risks. Impacts and ultimately breaks can occur.

SUMMARY

An aspect of the invention provides an ejector for insertion into a receptacle, the injector comprising: a base element including a throat that fluidically connects a first opening and a second opening to each other, wherein the throat includes a narrowest part that is fluidically connected to an associated third opening, wherein the throat widens, at least partially, towards the first and/or second openings, and wherein, as a functional component, the ejector can be inserted into and/or positioned in a mating receptacle in a correct orientation so as to function as a jet pump in an arrangement.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
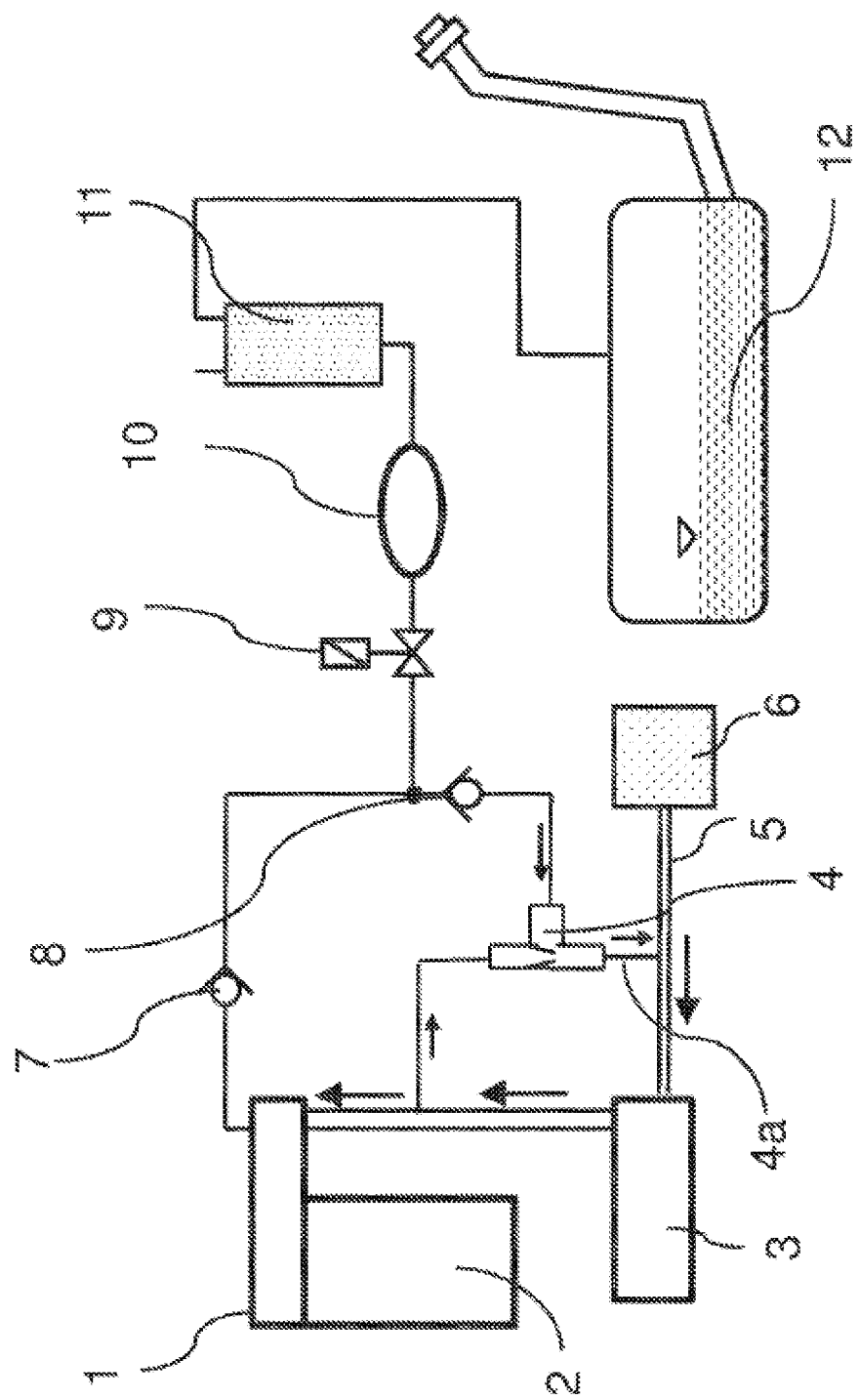
FIG. 1 a schematic view of a first regeneration systems of the state of the art with an ejector of the state of the art that is arranged as a separate part.
Figure 2:
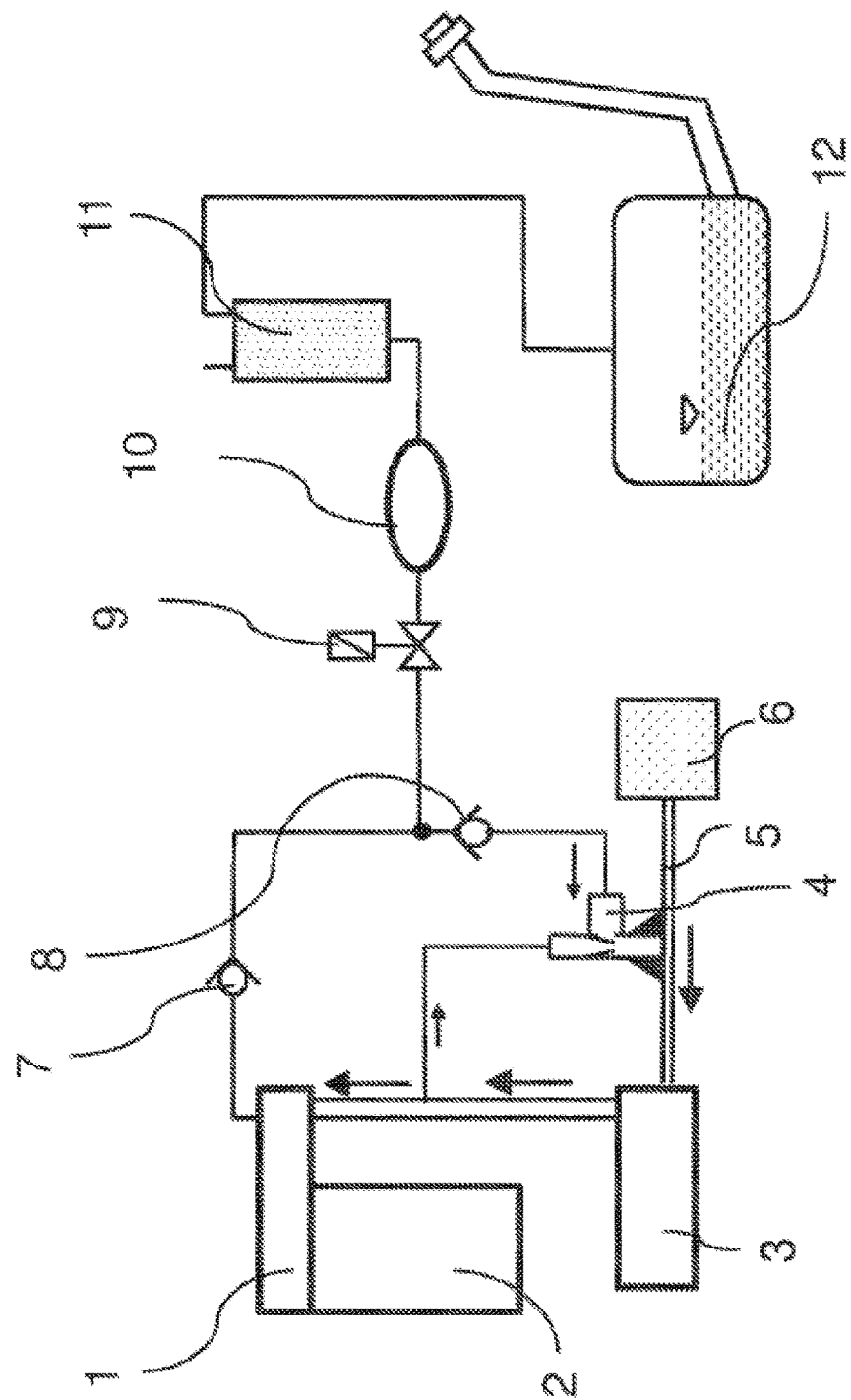
FIG. 2 a schematic view of another regeneration system of the state of the art with an ejector of the state of the art that is configured in one piece with an intake system of a turbocharger, preferably it is welded to its outlet connection fitting.

Before the backdrop set forth in the Background, an aspect of the invention puts forward an arrangement with an ejector that has a compact structure requiring little installation space, that permits a sufficient pumping action, and that, in case of an error, said error can be unambiguously detected and diagnosed as the source of the problem.

According to an aspect of the invention, it has been recognized that the ejector—as a separate, insertable functional component—has to be uncoupled from the connection fittings for a feed coming from a nozzle or a mixing chamber. Here, it has been concretely recognized that a break of at least one of the two connection fittings for the feed causes a malfunction that can be clearly diagnosed. It was then recognized that a separate arrangement of the ejector can reduce projections to a minimum, namely, especially to the absolutely necessary fitting length. In this manner, the ejector or an arrangement that accommodates the ejector is hardly damaged by breaks or impacts with other objects. A configuration of the ejector that appropriately matches a receptacle ensures that it will be inserted into the receptacle in the correct orientation. In this context, stops are conceivable that ensure the correct orientation. It is also conceivable to press the ejector into the receptacle in the correct orientation, thereby affixing it. Therefore, the ejector is configured in such a way that, as a functional component, it can be inserted into and/or positioned in a mating receptacle in the correct orientation so as to fulfill its function as a jet pump in an arrangement.

The base element, together with the throat, could form a Venturi tube, whereby the throat has two conical sections that taper, at least in certain areas, towards the narrowest part. As soon as a gaseous or fluid medium flows through a Venturi tube, the dynamic pressure, namely, the back pressure, is at a maximum, and the static pressure is at a minimum at the narrowest part of the tubular throat. Since the same quantity of fluid has to flow through everywhere, the velocity of a flowing fluid rises in relation to the cross sections of the tubular throat when the fluid is flowing through the narrowest part. At the same time, the pressure decreases in the first connection fitting, which opens up precisely into the narrowest part. Thus, a suction medium can be sucked in via the first connection fitting from a mixing chamber.

The base element could accommodate a separate insert element that is at least partially configured as a truncated cone and that has a conically shaped throat channel forming part of the throat, namely, a conically shaped section of the throat. Owing to an insert element, the conicity of the second section, which faces the second opening, can be variably adjusted.

The base element could have two grooves that surround the throat on an outer circumference of the base element and that are arranged on both sides of the third opening. Gaskets can be placed into the grooves.

Before this backdrop, gaskets could be placed into the grooves. This allows pressure chambers to be sealed vis-à-vis each other.

The base element could have a first stop configured as a radially extending ring surface that is part of an encircling bead. In this manner, an annular gap can be formed with a shoulder in the receptacle, thus permitting a small amount of axial play when the ejector is inserted into the receptacle.

The base element could have a second stop configured as an end surface that circumscribes the second opening. The end surface can readily come to rest on a shoulder or on a projection inside the receptacle once the ejector has reached its correct orientation after being inserted.

Generally speaking, it is conceivable for the stops to correspond to stop devices or counter-surfaces in the receptacle and/or in the intake system of a turbocharger, and these stops prescribe or ensure the functionally adequate insertion depth of the ejector.

The base element could have a latching tab that is arranged on the side of the second opening. The latching tab, which is preferably configured to be resilient, can extend behind an edge in the second connection fitting, thereby securing the ejector against slipping out of the receptacle.

According to the invention, an arrangement comprises an ejector of the type described here as well as a receptacle in which the ejector is accommodated as a separate functional component, whereby the receptacle has two connection fittings, and whereby the receptacle has a receiving area on the outlet side that is fluid-connected to the two connection fittings. The ejector can be inserted into the receptacle as a separate functional component, especially structurally separate from the connection fittings, so as to fulfill its function as a jet pump.

The receptacle could be configured in one piece with an intake system of a turbocharger or in one piece with part of this intake system. Consequently, the receiving area on the outlet side can run inside the walls of the intake system.

Owing to the simple and sturdy structure shown here, the ejector is suitable for use in regeneration systems of motor vehicles.

The elongated ejector can be inserted like a cartridge into the receptacle and, depending on the structural means provided, can also be removed from it once again.

Preferably, the ejector is inserted through the receiving area on the outlet side so that its third opening is flush with the first connection fitting.

Figure 3:
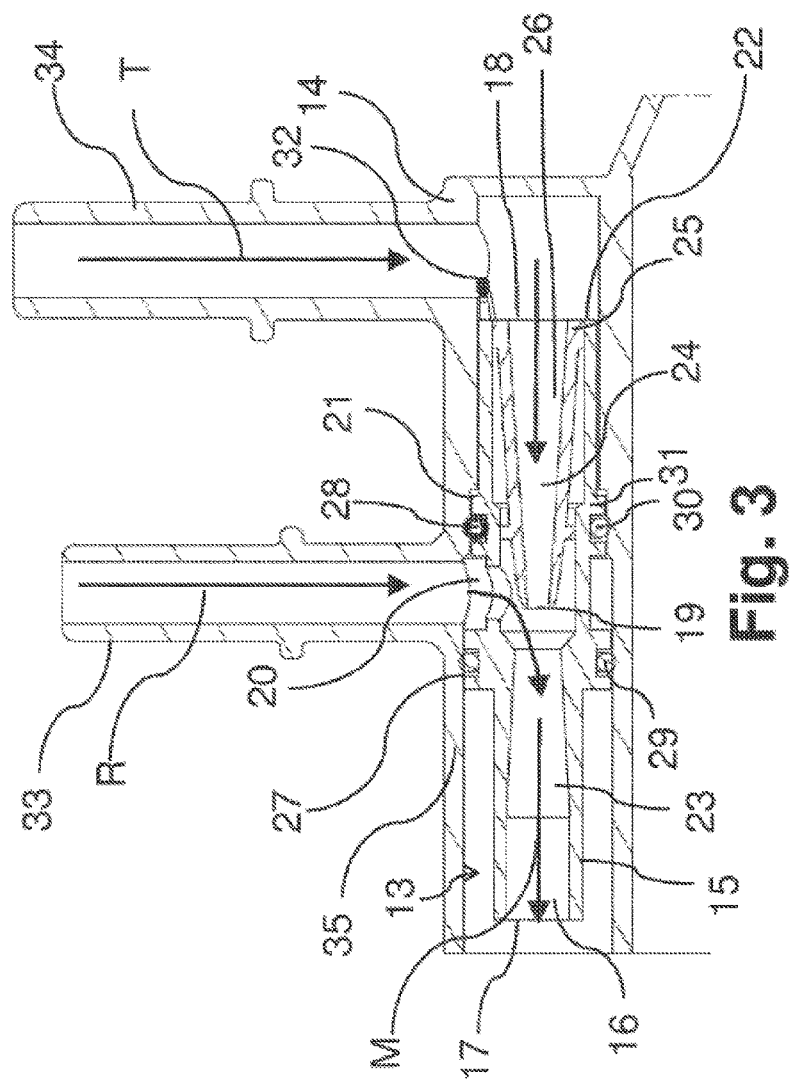
FIG. 3 an ejector according to the invention that—as a separate functional component—can be inserted into and removed from a receptacle, as well as an arrangement comprising the receptacle and the ejector, whereby the ejector is inserted into the receptacle.

FIG. 3 shows an ejector 13 for insertion into a receptacle 14, comprising a base element 15 with a throat 16 that fluid-connects a first opening 17 and a second opening 18 to each other, whereby the throat 16 has a narrowest part 19 that is fluid-connected to an associated third opening 20, and whereby the throat 16 widens, at least in sections, towards the first and second openings 17, 18.

The throat 16 widens, starting from the narrowest part 19 and going towards the second opening 18. The throat 16 widens in sections towards the first opening 17.

The ejector 13 is configured in such a way that, as a functional component, it can be inserted into a mating receptacle 14 so as to fulfill its function as a jet pump in an arrangement. The base element 15 has at least one stop 21, 22 for placement on the receptacle 14.

The base element 15, together with the throat 16, forms a Venturi tube, whereby the throat 16 has two conical sections 23, 24 that taper towards the narrowest part 19. The sections 23, 24 are parts of the throat 16, whereby their cross section surfaces that are oriented orthogonally to the direction of flow decrease towards the narrowest part 19.

The base element 15 accommodates a separate insert element 25 that is at least partially configured as a truncated cone and that has a conically shaped throat channel 26 forming part of the throat 16, namely, a conically shaped second section 24 of the throat 16. The first section 23 faces the first opening 17.

The base element 15 has two grooves 27, 28 that surround the throat 16 on an outer circumference of the base element 15 and that are arranged on both sides of the third opening 20. Gaskets 29, 30 that are configured as O-rings are accommodated in the grooves 27, 28.

The base element 15 has a first stop 21 configured as a radially extending ring surface that is part of an encircling bead 31. An annular gap is formed between the receptacle 14 and the ring surface, thus permitting axial play.

The base element 15 has a second stop 22 configured as an end surface that circumscribes the second opening 18. Here, no counter-surface is formed in the receptacle 14 for the second stop 22.

Rather, in this concrete embodiment, the base element 15 has a latching tab 32 that is arranged on the side of the second opening 18. The latching tab 32 is configured to be resilient and to be latched to the receptacle 14. The latch could also be configured as a detachable connection.

Thus, FIG. 3 also shows an arrangement comprising an ejector 13 and a receptacle 14 in which the ejector 13—as a separate functional component that is structurally separated and detachable from the receptacle 14—is accommodated, whereby the receptacle 14 has two connection fittings 33, 34 and whereby the receptacle 14, as a receiving area 35 on the outlet side, has an outlet connection fitting that is fluid-connected to the two connection fittings 33, 34.

Figure 4:
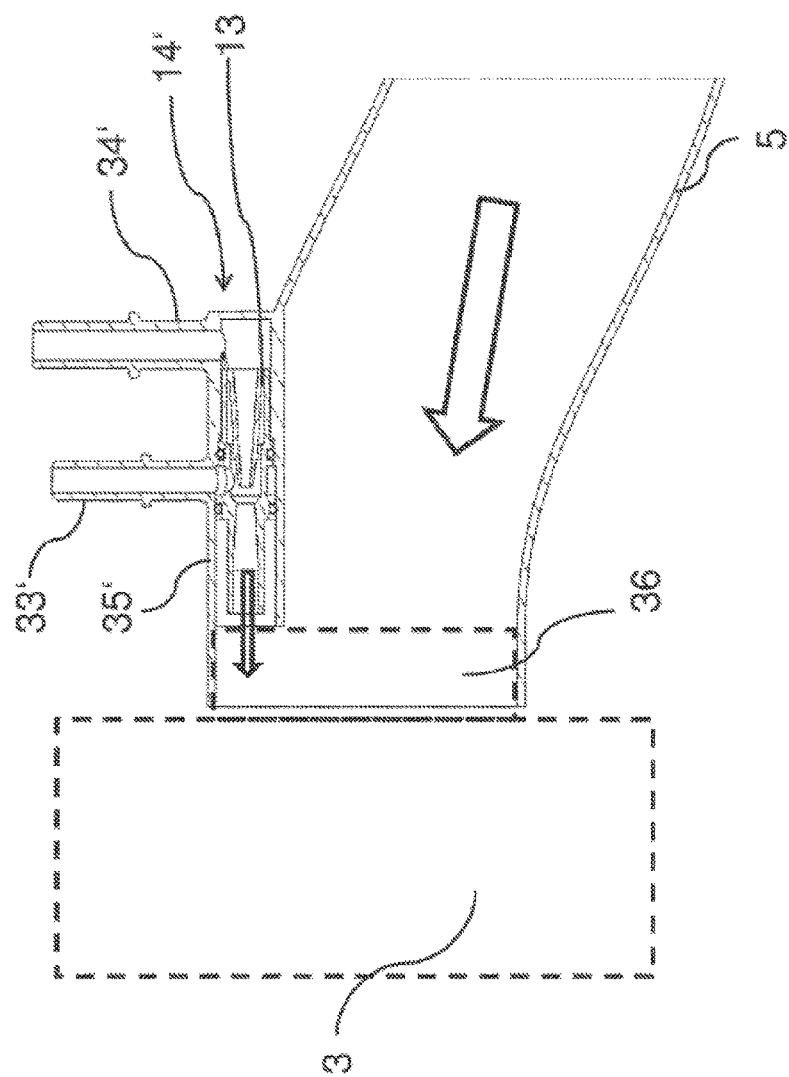
FIG. 4 an arrangement that has an ejector according to FIG. 3.

FIG. 4 shows that the receptacle 14' is configured in one piece with an intake system 5 of a turbocharger 3 or else in one piece with part of this intake system 5. Concretely speaking, the receptacle 14' is part of the wall of the intake system 5, whereby the connection fittings 33', 34' project with a suitable fitting length from the intake system 5 so that it can be readily connected to a mixing chamber (not shown here) or to a nozzle (not shown here). In this embodiment, together with the turbocharger 3, a stop device 36 can also be provided in order to prevent the ejector 13 from migrating towards the turbocharger 3 and moving away from its functionally proper position in the receptacle 14'.

Before this backdrop, FIG. 3 is a schematic view showing the mode of operation of the ejector 13, which is also referred to as a jet pump. A fluid jet T, namely, a drive flow that emerges from a nozzle (not shown here) at the highest possible velocity, achieves a pumping action. By means of a pulse transmission to a suction medium in a mixing chamber (likewise not shown here), this suction medium is accelerated and carried along by the fluid jet T. This is associated with a pressure drop in the suction medium. Owing to the pressure drop, a suction jet R, in this concrete case, a regeneration flow, is generated. The regeneration flow carries along the fuel constituents that are stored in the activated charcoal filter. A mixed flow then leaves the ejector 13 via the first opening 17.

Thus, a first connection fitting 33 is connected to a mixing chamber for a suction medium, and a second connection fitting 34 is connected to a nozzle. The receiving area 35 on the outlet side conveys the mixed flow M to the turbocharger 3.

FIG. 3 shows an embodiment of the ejector 13 in which both connection fittings 33, 34 for the feeds are physically separated from the actual ejector 13. This prevents the ejector 13 from inevitably being affected or coming loose due to a break if force is introduced onto one or both of the connection fittings 33, 34, for example, due to an impact.

A system error due to a break of one or both of the connection fittings 33, 34 is diagnosable as stipulated by American legislation during the OBD monitoring.

In FIG. 4, the connection fittings 33', 34' for the feeds are connected in one piece to the intake system 5 upstream from the turbocharger 3 or to a part thereof, and, as shown in FIG. 4, they could open up directly into the receptacle 14' for the actual ejector 13. This embodiment is space-saving and reduces the projections to a minimum, namely, to the necessary fitting length needed in order to provide connections.

The orientation of the connection fittings 33, 33', 34, 34' is not limited to the orientation shown in FIGS. 3 and 4, namely, the orthogonal orientation relative to the receiving area 35, 35' on the outlet side or relative to the outlet connection fitting. The embodiment according to FIG. 4, which provides for an outlet of the ejector 13 inside the wall, meets the recommendation of the American authorities.

The actual ejector 13 is inserted into a receptacle 14, 14' that is connected to the connection fittings 33, 33', 34, 34'. As shown in FIG. 4, it is likewise configured in one piece with the intake system 5 upstream from the turbocharger 3 or with a part thereof. The receptacle 14' is shaped out of the intake system 5 or out of part thereof.

After an appropriate position has been reached, the functionality of the ejector 13 is established. The precise position is prescribed by one or more stops 21, 22 or press fits. Since the actual connection fittings 33, 33', 34, 34' for the feeds are physically separated from the ejector 13, pressure chambers that are formed after the insertion are sealed relative to each other. As shown in FIGS. 3 and 4, the gasket can be in the form of O-rings.

Since the ejector 13 is inserted against a pressure chamber that is formed, it is secured against coming loose when exposed to pressure. It is secured by means of latching. However, it is also conceivable to secure the ejector 13 by means of a counter-piece, especially by the stop device 36 shown in FIG. 4, after the intake system 5 has been assembled.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE NUMERALS 1 intake manifold
2 engine
3 turbocharger
4 ejector of the state of the art
4a line from the ejector to the intake system
5 intake system
6 air filter
7 non-return valve
8 non-return valve
9 regeneration valve
10 sensor
11 activated charcoal filter
12 fuel tank
13 ejector according to the invention
14, 14' receptacle
15 base element
16 throat
17 first opening
18 second opening
19 narrowest part
20 third opening
21 first stop
22 second stop
23 first section
24 second section
25 insert element
26 throat channel
27 first groove
28 second groove
29 first gasket
30 second gasket
31 bead
32 latching tab
33, 33' first connection fitting
34, 34' second connection fitting
35, 35' receiving area on the outlet side
36 stop device

The invention claimed is:

1. An arrangement, comprising:
an ejector with a base element including a throat that fluidically connects a first opening and a second opening to each other, the throat including a narrowest part that is fluidically connected to an associated third opening, the throat widening, at least partially, towards the first and/or second openings; and
a receptacle in which the ejector is accommodated as a functional component so as to function as a jet pump in the arrangement, the receptacle including two connection fittings and a receiving area on an outlet side of the ejector that is fluidically connected to the two connection fittings,
wherein the receptacle is configured in one piece with an intake system of a turbocharger, or in one piece with part of the intake system.

2. The arrangement of claim 1, wherein the throat at least partially widens towards the first opening.

3. The arrangement of claim 1, wherein the throat at least partially widens towards the second opening.

4. The arrangement of claim 1, wherein the throat at least partially widens towards the first and second opening.

5. The arrangement of claim 1, wherein the base element, together with the throat, forms a Venturi tube,
wherein the throat includes two conical sections that taper, at least partially, towards the narrowest part.

6. The arrangement of claim 1, wherein the base element accommodates a separate insert element that is at least partially configured as a truncated cone and that includes a conically shaped throat channel,
wherein the conically shaped throat channel forms part of the throat in the form of a conically shaped section of the throat.

7. The arrangement of claim 1, wherein the base element includes two grooves that surround the throat on an outer circumference of the base element, and
wherein the two grooves are arranged on both sides of the third opening.

8. The arrangement of claim 7, further comprising:
gaskets placed into the grooves.

9. The arrangement of claim 1, wherein the base element includes a first stop configured as a radially extending ring surface that is part of an encircling bead.

10. The arrangement of claim 1, wherein the base element includes a second stop configured as an end surface that circumscribes the second opening.

11. The arrangement of claim 9, wherein the base element includes a second stop configured as an end surface that circumscribes the second opening.

12. The arrangement of claim 1, wherein the base element includes a latching tab that is arranged on a side of the second opening.

* * * * *